3,086,915
NON-DELIQUESCENT VITAMIN C CONCENTRATE

Philip Morse, La Habra, Calif., assignor to Nutrilite Products, Inc., Buena Park, Calif., a corporation of California
No Drawing. Filed Aug. 7, 1961, Ser. No. 129,557
11 Claims. (Cl. 195—2)

This application relates to a non-deliquescent vitamin C or ascorbic acid concentrate and a method for producing it from acerola cherries otherwise known as Barbados cherries and *Malpighia punicifolia*.

In previous applications, Serial No. 774,598, filed November 18, 1958 and Serial No. 3,710, filed January 21, 1960, and issued as U.S. Patent 3,012,942 on December 12, 1961, a process and products made by the process are described and claimed. By the process of the previous copending applications, a product was produced which had long shelf life, high vitamin C strength, and from which certain undesirable solid components of the cherry including its sugar content had been removed.

While it had long been recognized that certain plant juices such as those of lemons, cabbages, tomatoes, etc. contain vitamin C, and these are commonly used as foods having a source of vitamin C, the recovery or extraction of vitamin C concentrates has been considered commercially not feasible and uneconomic. My copending applications provided a commercially feasible, economic process for making a vitamin C concentrate from the acerola cherries. However, the powdered product was somewhat deliquescent.

According to the present invention a substantially non-hygroscopic powder is produced which has excellent storage stability or shelf life coupled with high ascorbic acid content and pleasant flavor.

The acerola or Barbados cherry (*Malpighia punicifolia*) is not a true cherry although it resembles cherries in appearance, hence the name. It is found in a number of tropical and semitropical areas, particularly in the West Indies. The vitamin C content is high, for example, 100 grams of ripe red cherries may contain about 1400 milligrams of vitamin C; the yellow cherries, approximately 2000 milligrams; and the green cherries, about 2800 milligrams. Thus, it is preferable to utilize the green or yellow fruit.

As is fully explained in my copending applications, care should be taken not to damage the fruit by overheating, mechanical bruising or undue exposure to the direct rays of the sun. The fruit should be processed as quickly as possible after harvesting since the ascorbic acid content deteriorates rapidly after being picked. Damaged fruit is even more readily susceptible to deterioration. The fruit is preferably processed immediately but may be held in frozen storage before processing.

The fruit is washed by a gentle washing procedure utilizing a minimum washing time so as to avoid leeching of the vitamin C from the fruit. The washing is usually by dipping, followed by a mild fresh water spraying adequate to remove foreign material so as to avoid contamination of the concentrate.

The juice from the whole cherry is then extracted. They may be first blanched and thereafter pressed to recover the juice. The juice should be clear and free of pulp and foreign material. Any residual pulp tends to develop off flavors during pasteurizing or aging. Preferably the freshly pressed juice filtered in a suitable filter apparatus such as a rotary filter or a filter press using a filter aid such as diatomaceous earth. Other means such as centrifuging may be used. At this point the juice contains about 9% by weight of soluble solid, including sugars, ascorbic acid, other organic acids, tannins, etc.

One of several producers may therefore be followed:

*Procedure 1.*—The single strength juice is brought to a pH of about 4.5 to about 8.0, preferably about 7.0 to about 7.5, by addition of a suitable base, such as calcium hydroxide, sodium hydroxide, sodium carbonate, calcium carbonate and the like. This results in the formation of a precipitate which is removed preferably by filtration or centrifuging or other suitable method, using a filter aid if necessary. This step of treating with the base may be carried out on the fresh unfiltered juice, although preliminary clarification is preferred. The base may be added as a solution or, in the case of calcium carbonate or calcium hydroxide may be added as a finely divided powder or slurry. The juice containing the base is allowed to stand at room temperature (60 to 85° F.), using mild agitation if the base is used in powdered form, for a period from one to 12 hours. Preferably the juice is cooled to a temperature of about 32 to 50° F. and permitted to stand. It has been found desirable to use approximately eight hours standing period at a temperature of about 33° F. The precipitate is composed of tannins and various insoluble organic and inorganic salts.

After filtering or otherwise clarifying the juice, it is subjected to concentration in a falling film evaporator, or other suitable evaporator to increase the solids content to about 20 to 80% and preferably to about 70 to 75% of solids. The concentrate is then dried to a powder, for example, by means of spray drying, vacuum shelf drying, vacuum drum drying and the like at temperatures of about 120 to 200° F., preferably about 150 to 170° F. using a drying time of about 0.5 to about 4 hours. In spray drying, of course, the drying operation is practically instantaneous. All of these drying methods are well known and need not be described in detail. It is important that the temperature does not reach a point at which the destruction of vitamin C occurs or undue caramelization of any sugars present takes place.

It is also possible to concentrate the neutralized juice prior to separation of the precipitated solids and to subject the concentrated liquid to clarification before the subsequent drying step. This is not the preferred procedure.

The dry product is cooled, removed from the pans, and may be ground to a fine powder. The powder upon exposure to humid air for long periods of time will absorb some moisture, but it does so slowly and not to any great extent. In general, it may be further processed, such as by being incorporated into tablets, and packaged, or may be mixed with other materials to form finished products at ordinary atmospheric conditions without elaborate precautions to prevent contact with moisture-containing air. The powder has along shelf life of a year or more without need for refrigeration.

Alternative to the above procedure the fresh, single strength juice, preferably after clarification, may be concentrated by known means to 20 to 60% soluble solids, neutralized with calcium hydroxide, sodium hydroxide, calicum carbonate, sodium carbonate or the like, then allowed to stand as described. It is then subjected to clarification as described, and may be either directly dried or may first be concentrated up to about 75–85% soluble solids and then dried, cooled, and ground to a fine powder.

*Procedure 2.*—According to a second method, tartaric acid may be added to the juice either before or after clarification and either before or after being concentrated to about 20–60% soluble solids. This requires the addition of about 0.5 to 1.5% tartaric acid, 0.75% by weight usually being optimum. The purpose of the tartaric acid treatment is to remove potassium compounds which upon concentration and drying of the juice may react with malic acid present to form potassium bimalate which is a somewhat sticky substance which interferes with the free flowing character of the powder.

The juice containing the tartaric acid is permitted to stand preferably from about one to about four hours, two hours being optimum, and may then be clarified by filtration or other suitable means. Alternatively, the unclarified juice may be subjected to the step about to be described and subjected to clarification after that step.

After treatment with tartaric acid the clarified or unclarified juice is treated with calcium hydroxide or calcium carbonate alone or in admixture with sodium hydroxide to a pH of about 4.5, the base being added in the manner previously described.

The juice is then allowed to stand for several hours, say, about one to about three hours, at room temperature. The precipitated calcium tartrate may or may not be removed by appropriate means, such as filtration or centrifuging at this stage.

Additional base is then added to raise the pH to about 7.5 but not substantially above about 8.0. Preferably the pH is adjusted to about 7.0 to about 7.5. The juice may then be allowed to stand for a period approximately one to twelve hours at room temperature (65–85° F.) or in a cooler at a temperature below room temperatures, say as low as about 32° F. but above the freezing point of the solution. Preferably the treatment is carried out at about 33° to about 40° F. for approximately six to ten hours. The juice may then be filtered to remove the solids which have separated or may first be subjected to concentration to increase the soluble solids content to about 20 to about 80%, preferably at about 30% to about 40%. If the juice has not been previously filtered or if any further precipitate appears, it should be filtered or otherwise clarified at this point.

In case the juice was concentrated prior to the steps beginning with the addition of tartaric acid it may or may not require further concentrating at this point.

The clear concentrate is then subjected to a drying step as previously described keeping the temperatures below that at which deterioration of the powder occurs and keeping the time and temperatures at a minimum both for processing economy and in the interest of obtaining high quality products. As previously indicated, in a drier such as a Stokes vacuum shelf drier a temperature of 120° F. to 200° F. and preferably about 160° F. for a time of about 0.5 to about four hours preferably about one hour, is used, and being preferably about a $\frac{1}{16}$ inch layer of concentrate on each tray.

After cooling and crushing to produce a powder of desired particle size, the product is found to be substantially non-hygroscopic.

*Procedures 3.*—According to another procedure the sugar content of the juice may be reduced by subjecting it to fermentation. Preferably (as is the case in the previously described procedures) the juice is pasteurized and is then placed in a fermentation vessel where it is subjected to fermentation in the presence of yeasts or other fermentation inducing materials such as those described in my copending applications above referred to. The fermentation may be carried out for a sufficient period of time to reduce the sugar content in the juice to less than about 1%. The yeasts and the method of fermentation are well known but are described in detail in my said applications. The duration of the fermentation is followed by known means by making spot analyses from time to time. After fermentation the solids are removed by filtration or by centrifuging and the resultant juice may be treated by any one of the previously described procedures using a base, or tartaric acid followed by treatment with a base, either with or without preliminary concentration to increase the soluble solids content in the juice to say 20% to 80% by weight, preferably 60–75%. The alcohol produced during fermentation of the juice is removed during the evaporation step, and may be recovered as a valuable by-product.

*Procedure 4.*—As a further alternative, the fermented and clarified juice is subjected to concentration to about 20–80% and preferably about 30–60% soluble solids content using conventional methods such as those described before, e.g. in a falling film flash evaporator at a temperature of about 40° F. to about 100° F. The concentrate from this step may then be subjected to a further treatment such as is described in my copending applications, to precipitate certain undesirable solids using methyl alcohol, acetone or a mixture of methyl alsohol and acetone. While the amount of solvent utilized may vary, usual amounts are about 5 to about 15 times the weight of the concentrate, about 8 to 10 times the weight of the concentrate being preferred. After the concentrate and the solvent have been mixed together preferably by agitation, a flocculent precipitate forms which may be separated by filtration and washed with methyl alcohol. This precipitate may be dried and used as an ingredient in animal foods.

The methyl alcohol and acetone may be added separately in a step-size procedure with filtration between each step or may be added simulutaneously.

The methyl alcohol and acetone are recovered by known procedures preferably by vacuum distillation, and may be reused in the process. The recovered juice may then be treated by any one of the foregoing described procedures employing treatment with a base followed by clarification or with tartaric acid followed by treatment with the base, using appropriate clarification evaporation and drying steps to produce a non-hygroscopic powder rich in vitamin C.

The following examples are given to illustrate the process but should not be construed as unduly limiting the invention.

Example I

The soluble solids content of fresh acerola juice was adjusted on the concentrate to 21.5%. A 15% slurry of calcium hydroxide was added to adjust the pH to 7.5. The mixture was allowed to stand at room temperature for several hours and then clarified. The samples were placed in a stainless steel pan and dried to a powder in the Stokes vacuum shelf drier at 160° F. for 1 hour using full vacuum. The cake removed and ground to a fine powder. Analysis of powder.

| Storage time: | Ascorbic acid, percent |
|---|---|
| 0 | 20.8 |
| 2 weeks | 21.0 |
| 6 weeks | 21.2 |
| 3 months | 20.8 |

Example II

The soluble solids content of freshly expressed and clarified acerola juice was adjusted to a concentrate of 40% by weight. The pH was adjusted to 7.15 with calcium hydroxide (25% slurry). The mixture was placed in cooler at 33° F. for approximately 18 hours. It was then removed from cooler, warmed to 72.5° F. (24° C.), and clarified by passing through a Sharples super centrifuge. The filtrate was concentrated in a Mojonnier falling film evaporator to 56° Brix, and then spray dried. The dry, non-hygroscopic powder had an ascorbic acid content of 21.0% by weight.

Example III

Weigh out 2000 grams of a concentrate of 72% soluble solids content and add 3000 ml. distilled water. Add 120 g. tartaric acid, allow to set at room temperature for 2 hours, and clarify by passing it through the Sharples super centrifuge. Adjust to pH 4.5 with a 25% slurry of calcium hydroxide and allow to set 30 minutes at room temperature again. Clarify by passing it through the Sharples super centrifuge. Adjust to pH 7.5 with a slurry of calcium hydroxide and place in the cooler at about 33° F. overnight. Clarify by passing it through the Sharples super centrifuge. Place the clear concentrate in the Stokes vacuum shelf drier and dry at 160° F. for 3 hours using full vacuum, and then crush and grind the cake. The powder analyzed 21.0% of ascorbic acid.

Example IV

An acerola juice concentrate was placed in a 100 gallon stainless steel tank and diluted to 21.3% soluble solids. Yeast was added and incubated for 48 hours at 78° F. The mixture was clarified by passing through a Sharples super centrifuge, and concentrated in the Mojonnier falling film evaporator to 64° Brix. To 2000 grams of the concentrate was added 3000 ml. of distilled water to a Brix of 25.5°. To the clear concentrate was added 120 grams of tartaric acid and the mixture held at room temperature for 2 hours. It was then clarified by passing it through the Sharples super centrifuge. The pH of the clear concentrate was adjusted to 7.5 with calcium hydroxide slurry, and it was held in the cooler overnight (34° F.). It was removed from cooler and warmed to 72.5° F. (24° C.), and clarified by passing it through the Sharples super centrifuge. The clear concentrate in stainless steel pans was dried in the Stokes vacuum shelf drier at 160° F. for 3 hours, and the dry cake was crushed and ground. The non-hygroscopic powder analyzed 39.1% by weight of ascorbic acid.

I claim:

1. A process for producing a non-deliquescent powder from the juice of acerola cherry which comprises adding to said juice a base selected from the group consisting of the oxides, hydroxides, and carbonates of an alkaline earth metal, sodium hydroxide and sodium carbonate, and mixtures thereof, to a pH of about 4.5 to about 8.0 removing the precipitate formed and subjecting the clear liquid to a drying step to produce a dry, substantially non-deliquescent powder.

2. The process of claim 1 wherein the juice is first treated with tartaric acid and is thereafter treated with said base prior to clarification and final drying.

3. The process of claim 1 wherein single strength acerola juice is evaporated to produce a concentrate of about 20% to about 80% soluble solids prior to addition of the base.

4. The process of claim 2 wherein single strength juice is subjected to a concentrating step to a soluble solids content of about 20 to about 80% by weight prior to adding the tartaric acid.

5. The process according to claim 2 wherein said juice is subjected to fermentation to reduce its sugar content and said fermented juice is concentrated to about 20–80% soluble solids prior to adding the tartaric acid.

6. The process of claim 1 wherein the acerola juice is subjected to fermentation to reduce the sugar content prior to adding the base thereto.

7. The process of claim 2 wherein the acerola juice is subjected to fermentation prior to adding the base thereto.

8. The process of claim 1 wherein the acerola juice is subjected to fermentation to reduce its sugar content and the resulting fermented acerola juice is concentrated to about 20–80% soluble solids prior to addition of the base.

9. A process for producing a non-deliquescent powder from the juice of acerola cherry which comprises subjecting said juice to fermentation to reduce its sugar content, concentrating said juice to produce a concentrated juice containing about 30–80% soluble solids, treating the concentrated juice with a solvent selected from the group consisting of methyl alcohol and acetone and mixtures of methyl alcohol and acetone to form a precipitate, separating the solvent-treated juice into a precipitate and a clarified concentrate, adding to the clarified concentrate a base selected from the group consisting of oxides, hydroxides and carbonates of an alkaline earth metal, sodium oxide and sodium carbonate, and mixtures thereof, to a pH of about 4.5 to about 8.9, removing the precipitate formed and subjecting the clear liquid to a drying step to produce a dry, substantially non-deliquescent powder.

10. The process according to claim 9 wherein tartaric acid is added to said clarified concentrate before said base is added thereto.

11. The process according to claim 1 wherein the base is calcium hydroxide.

No references cited.